United States Patent [19]

Shirato et al.

[11] Patent Number: 5,274,169
[45] Date of Patent: Dec. 28, 1993

[54] METHOD OF PREPARING INSOLUBLE HYDROLYSABLE TANNIN AND METHOD OF TREATING WASTE LIQUID WITH THE TANNIN

[75] Inventors: Wataru Shirato; Yoshinobu Kamei, both of Ibaraki, Japan

[73] Assignee: Mitsubishi Nuclear Fuel Company, Ltd., Tokyo, Japan

[21] Appl. No.: 918,371

[22] Filed: Jul. 23, 1992

[30] Foreign Application Priority Data

Aug. 7, 1991 [JP] Japan .................................. 3-222288

[51] Int. Cl.$^5$ ............................................. C07C 69/88
[52] U.S. Cl. .................................................. 560/68
[58] Field of Search ........................................ 560/68

[56] References Cited

U.S. PATENT DOCUMENTS

| | | | |
|---|---|---|---|
| 404,440 | 6/1889 | Saarbrach | 560/68 |
| 495,768 | 4/1893 | Austen | 560/68 |
| 517,626 | 4/1894 | Reinus | 560/68 |
| 2,173,977 | 9/1939 | Oberjell | 560/68 |
| 4,090,919 | 5/1978 | Chibata et al. | 560/68 |

*Primary Examiner*—Paul J. Killos
*Attorney, Agent, or Firm*—McAulay Fisher Nissen Goldberg & Kiel

[57] ABSTRACT

An insoluble hydrolysable tannin is prepared by dissolving a hydrolysable tannin powder in aqueous ammonia; mixing the resulting solution with an aldehyde aqueous solution to form a precipitate; heating the precipitate; mixing the heated precipitate with a mineral acid; and filtering the resulting mixture to leave a residue on a filter. The inventive insoluble tannin exhibits high adsorption properties for heavy metal elements and is insoluble in either water, acid, or alkali. Methods for treating waste liquids and recovering heavy metal elements therefrom using the inventive insoluble tannin are disclosed.

5 Claims, 1 Drawing Sheet

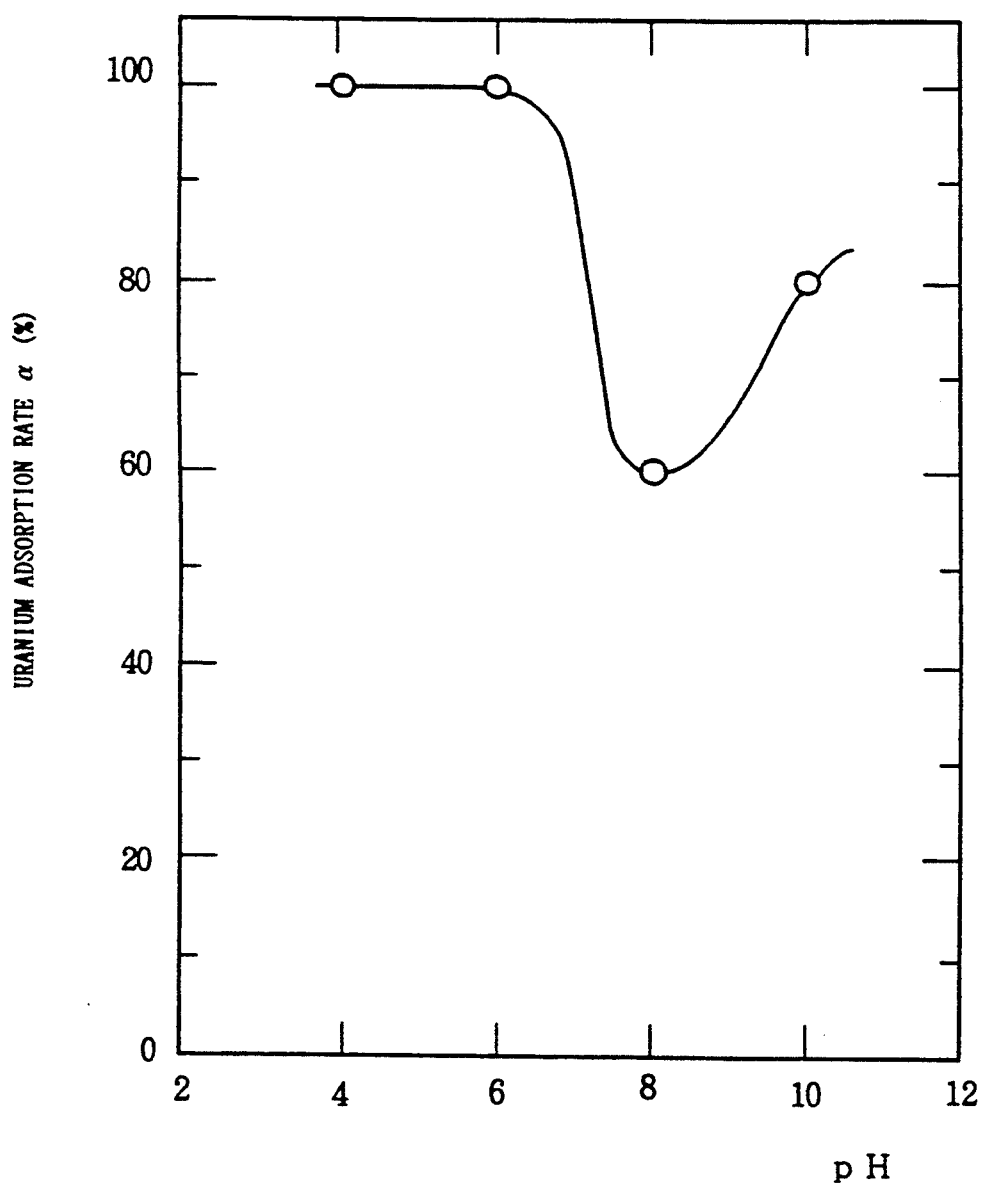
FIG.

METHOD OF PREPARING INSOLUBLE HYDROLYSABLE TANNIN AND METHOD OF TREATING WASTE LIQUID WITH THE TANNIN

BACKGROUND OF THE INVENTION

This invention relates to a method for preparing an insoluble hydrolysable tannin which can adsorb heavy metal elements including actinides, such as, uranium, thorium, transuranium elements, and the like, and to the insoluble hydrolysate tannin obtained thereby. It also relates to a method for treating a waste liquid containing the heavy metal element in which the heavy metal is adsorbed and separated by using the insoluble tannin.

DESCRIPTION OF THE RELATED ART

Known tannins include a hydrolysable tannins which are decomposed by acid to produce sugar; condensed tannins which produce anthocyanidin dyestuff when treated with acid; and a tannin such as a "kaki-shibu", that is, persimmon juice, which is decomposed by acid but does not produce a sugar and which is an intermediate between a hydrolysable tannin and a condensed tannin.

Nuclear fuel elements, such as, uranium, thorium, and the like are present in waste liquid effluent from nuclear fuel processing facilities. A method for preparing an adsorbent for such nuclear fuel elements from a kaki-shibu is disclosed in Unexamined Published Japanese Patent Applications No.63-61998 and No.1-155947. This adsorbent is a hydrogel composition and is produced by reacting a kaki-shibu with an aldehyde or an acid, such as, sulfuric acid, phosphoric acid, and the like, thereby causing gelation of the kaki-shibu.

The present applicant has filed a patent application relating to a method for producing an adsorbent of insoluble tannin capable of adsorbing nuclear fuel elements and iron ions, which comprises dissolving a tannin powder in an aldehyde aqueous solution; adding ammonia to the resulting solution to form a precipitate; and aging the precipitate to obtain the insoluble tannin (Unexamined Published Japanese Patent Application No.3-206094).

In the former method, when a kaki-shibu is used as the raw material, an adsorbent consisting of a desired stable gel composition can be obtained. In the latter method, when a condensed tannin is used as the raw material, an adsorbent consisting of a desired insoluble tannin can be obtained.

However, a problem with both methods is that when a hydrolysable tannin is used as the raw material, a satisfactory adsorbent is not obtained.

SUMMARY OF THE INVENTION

An object of this invention is to provide a method of preparing an insoluble hydrolysable tannin capable of adsorbing heavy metal elements by using a hydrolysable tannin which is plentiful in nature other than a condensed tannin or a kaki-shibu.

Another object of this invention is to provide a method of treating a waste liquid wherein heavy metal elements in the waste liquid can be efficiently adsorbed and recovered by using the inventive insoluble tannin.

A method for obtaining an insoluble tannin according to this invention comprises the steps of dissolving a hydrolysable tannin powder in aqueous ammonia; mixing the resulting solution with an aldehyde aqueous solution to form a precipitate; heating the precipitate; mixing the heated precipitate with a mineral acid; and filtering the resulting mixture to leave a residue on a filter.

In this specification, "an insoluble tannin" means a tannin which is made insoluble in water, an acid, or an alkali.

A method of treating a waste liquid according to this invention comprises contacting the insoluble hydrolysable tannin prepared by the above method with a waste liquid containing a heavy metal element; or packing the insoluble tannin into a column, and passing a waste liquid containing the heavy metal element through the packed column, whereby the heavy metal element is adsorbed by the insoluble tannin.

BRIEF DESCRIPTION OF THE DRAWING

The FIGURE is a graph showing the result of an adsorption test according to this invention.

DESCRIPTION OF THE PREFERRED EMBODIMENT

In the preparing method according to this invention, a hydrolysable tannin powder is dissolved in aqueous ammonia, followed by mixing the resulting solution with an aldehyde aqueous solution to form a precipitate.

As used herein, a hydrolysable tannin is a tannin which forms sugar (normally, glucose), gallic acid, and other related compounds by the action of an acid, an alkali, or an enzyme. The compound has a depside bond which is formed by combining gallic acid or an analogous compound with sugar. Representative examples of the hydrolysable tannin include (1) gallotannins, e.g., chinese tannin, or turkish tannin, which is hydrolysed to form mainly gallic acid; (2) ellagic tannin, e.g., mirobalan tannin, divi-divi tannin, algarobilla tannin, which is hydrolysed to form related compounds of ellagic acid and gallic acid; (3) an essence extracted from cranesbill, Mallotus japonics, the peel of pomegranate, mirobaran, and the like.

In the inventive method, it is preferred that when a hydrolysable tannin powder is added to aqueous ammonia of pH 8 or more, the tannin powder be added in an amount of 0.02 wt % or more based on the total amount of the aqueous ammonia. When the amount of the tannin powder is less than 0.02 wt %, a precipitate will not occur even if an aldehyde is added thereto. It is preferred that an aldehyde which undergoes a condensation reaction with the tannin powder to form a precipitate be added in an amount with which all of the dissolving tannin can be precipitated. For instance, it is preferred that 600 to 1400 ml of 37 wt % aldehyde aqueous solution be added to a solution which is formed by dissolving 160 g of the tannin powder in one liter of 13.3N aqueous ammonia (226 g $HN_3/l$). If the aldehyde solution is less than 600 ml, the condensation reaction will not proceed sufficiently and tannin which does not precipitate will remain. If the aldehyde solution exceeds 1400 ml, the aldehyde is in excess, and is thus economically disadvantageous.

In the inventive method, as the aldehyde solution, an aqueous solution of formaldehyde, acetaldehyde, or glutaraldehyde may be preferably used. Aqueous formaldehyde solution is preferable because it hastens the generation of a precipitate.

Preferably, the liquid containing the precipitate is stirred for at least 30 minutes, followed by heating to make the precipitate insoluble in water, usually, at a temperature of least about 60° C. The liquid containing the precipitate is heated as it is. After heating, the liquid containing the precipitate is mixed with mineral acid to make the precipitate insoluble in acid and alkali. For example, (1) the liquid containing the precipitate is mixed with a dilute mineral acid as it is, (2) after filtering the liquid containing the precipitate, the filtered precipitate is mixed with a dilute mineral acid, and (3) after filtering the liquid containing the precipitate, the filtered precipitate is mixed with pure water and then the resulting mixture is further mixed with a concentrated mineral acid. Nitric acid, hydrochloric acid, sulfuric acid, and the like is used as the mineral acid.

The residue reacted with the mineral acid is filtered to remove water content by filtering, thereby obtaining an end product consisting of a tannin insoluble in either water, an acid, or an alkali.

The insoluble tannin thus obtained is suitable for adsorbing heavy metal elements including cadmium, lead, chromium, mercury, iron and actinides, such as, uranium, thorium, transuranium elements, etc.

Conventional column or batch operations may be adopted to adsorb and separate heavy metal elements in the inventive method. In particular, the inventive insoluble tannin can be charged into a column to thereby adsorb heavy metal elements. Subsequently, a dilute mineral acid can be passed through the insoluble tannin in the column to elute the metal from the insoluble tannin. The insoluble tannin which has adsorbed heavy metal elements can also be added to a dilute mineral acid and agitated, thereby eluting the metal elements from the insoluble tannin. Nitric acid, hydrochloric acid, sulfuric acid, and the like are used as the dilute mineral acid.

Tannins extracted from a variety of natural products can be used as raw materials for the hydrolysable tannin of this invention which provides for effective use of resources. In addition, since the tannin is inexpensive and easy to obtain, and is converted to the inventive adsorbent with only a few preparatory steps, it is well suited for mass production, and is thus economically advantageous.

The inventive adsorbent obtained from a variety of hydrolysable tannins exhibits excellent adsorption ability.

The inventive insoluble tannin exhibits especially excellent adsorption ability for a variety of metal elements which include uranium and thorium, which are generated from nuclear fuel manufacturing processes; uranium in sea water; transuranium elements generated from fuel reprocessing processes, such as, curium, americium, neptunium, and plutonium; metal elements, such as, cadmium, lead, hexavalent chromium, mercury, and iron. As a result, the inventive adsorbent is useful for a broad spectrum of areas.

Further, the inventive adsorbent having adsorbed heavy metal elements therein does not generate poisonous gases on incineration and the volume of adsorbent can be greatly decreased by incineration, thereby reducing the yield of the solid waste. Depending upon the kind of metal element adsorbed by the inventive adsorbent, a solid waste can be obtained containing a pure metal oxide from which is possible to reclaim the metal.

Additionally, when the inventive insoluble tannin having adsorbed heavy metal elements therein is in contact with a dilute mineral acid, the metal elements can be easily eluted from the insoluble tannin to recover and purify the metal.

The present invention is described in greater detail with reference to the following examples, although it is not limited thereto.

EXAMPLE 1

8 g of gallotannin powder corresponding to a hydrolysable tannin powder was added to 50 ml of 13.3N aqueous ammonia, followed by stirring for five minutes to dissolve it. To the resulting solution was added 65 ml of an aqueous solution containing 37 wt % formaldehyde, followed by stirring for five minutes for uniform mixing. When this stirring was stopped, a yellow precipitate formed. After the resulting liquid containing the precipitate was stirred for 30 minutes, the stirred liquid was filtered through filter paper (Toyo Filter Paper No.2). The precipitate thus obtained was added to 50 ml of pure water, and heated at 70° C. for three hours with stirring. The heated liquid was filtered through the same filter paper as the above. Subsequently, the precipitate thus obtained was added to 0.1N dilute nitric acid, followed by stirring for 30 minutes. Finally, the nitric acid solution was filtered through the same filter paper as the above, followed by drying the filtered precipitate at 80° C. to thereby obtain an insoluble tannin.

EXAMPLE 2

The liquid containing the precipitate, which is obtained in Example 1, was stirred for 30 minutes, followed by heating at 90° C. for two hours without filtering. To the liquid thus concentrated was added 50 ml of pure water, thereby diluting the liquid. Subsequently, 13.3N concentrated nitric acid was added to the diluted liquid to make the pH 2, followed by stirring for 30 minutes. Finally, the nitric acid liquid was filtered through the same filter paper as in Example 1, followed by drying the filtered precipitate at 80° C. to thereby obtain an insoluble tannin.

ADSORPTION TEST

The following test for adsorption of uranium was conducted using the insoluble tannin obtained in Example 1.

Four 125 ml solutions, each with an uranium concentration of 100 ppb and a pH of 4, 6, 8 and 10, were individually charged into each of four vessels, respectively. 50 mg (dry weight) of the insoluble tannin produced in the Example 1 was added to each of the solutions. The solutions were stirred for about two hours to adsorb the uranium to the insoluble tannin, so that the respective uranium adsorption rate could be measured.

The results are shown in the FIGURE, wherein $\alpha$ stands for an adsorption rate which is calculated from the following formula.

$$\alpha = [(C_o - C_t)/C_o] \times 100(\%)$$

wherein $C_o$ represents an uranium concentration of the starting liquid before adding an adsorbent thereto; $C_t$ represents the uranium concentration of the solution after adsorbing the uranium by adding an insoluble tannin thereto.

As shown clearly in the FIGURE, the insoluble tannin produced in Example 1 had a high uranium adsorption rate.

The inventive insoluble hydrolysable tannin is advantageous since it exhibits desirable adsorption levels through a wide range of pH values such as those normally encountered in waste liquids containing heavy metal elements.

We claim:

1. A method of preparing an insoluble hydrolyzable tannin comprising the steps of:
   (a) dissolving a hydrolyzable tannin powder in aqueous ammonia;
   (b) mixing the resulting solution with an aqueous solution of an aldehyde selected from the group consisting of formaldehyde, acetaldehyde and glutaraldehyde to form a precipitate;
   (c) heating the precipitate at a temperature and for a time sufficient to make the precipitate insoluble in water;
   (d) mixing the precipitate from step (c) with a mineral acid to make it insoluble in acid and alkali;
   (e) filtering the resulting mixture to separate the precipitate; and
   (f) drying the separated precipitate.

2. The method of claim 1, wherein in step (d), the liquid containing the precipitate is mixed with a dilute mineral acid as it is.

3. The method of claim 1, wherein in step (d), after filtering the liquid containing the precipitate, the filtered precipitate is mixed with a dilute mineral acid.

4. The method of claim 1, wherein after filtering the liquid containing the precipitate, the filtered precipitate is mixed with pure water and then the resulting mixture is further mixed with a concentrated mineral acid.

5. The method of claim 1 wherein the aldehyde is formaldehyde.

* * * * *